(12) United States Patent
Gan et al.

(10) Patent No.: US 9,734,164 B2
(45) Date of Patent: Aug. 15, 2017

(54) METHOD, SERVER, DEVICE, AND TERMINAL DEVICE FOR PROVIDING AN IMAGE SEARCH

(71) Applicants: BEIJING JINGDONG SHANGKE INFORMATION TECHNOLOGY CO, LTD., Haidian District, Beijing (CN); BEIJING JINGDONG CENTURY TRADING CO., LTD., Beijing (CN)

(72) Inventors: Yongzhou Gan, Beijing (CN); Zhengang Jing, Beijing (CN); Huiman Hou, Beijing (CN); Yuhong Xiong, Beijing (CN); Jianming Jin, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 1 day.

(21) Appl. No.: 14/891,547

(22) PCT Filed: May 9, 2014

(86) PCT No.: PCT/CN2014/077186
§ 371 (c)(1),
(2) Date: Nov. 16, 2015

(87) PCT Pub. No.: WO2014/183591
PCT Pub. Date: Nov. 20, 2014

(65) Prior Publication Data
US 2016/0092445 A1 Mar. 31, 2016

(30) Foreign Application Priority Data
May 16, 2013 (CN) .......................... 2013 1 0181762

(51) Int. Cl.
*G06K 9/00* (2006.01)
*G06F 17/30* (2006.01)
(Continued)

(52) U.S. Cl.
CPC ....... *G06F 17/3025* (2013.01); *G06K 9/4652* (2013.01); *G06K 9/6202* (2013.01);
(Continued)

(58) Field of Classification Search
CPC .. G06K 9/6201; G06K 9/4652; G06K 9/6215; G06T 2207/10024; G06T 3/40; H04N 1/60
See application file for complete search history.

(56) References Cited

U.S. PATENT DOCUMENTS

| 5,586,197 A * | 12/1996 | Tsujimura | G06F 17/3025 382/162 |
| 8,331,727 B2 * | 12/2012 | Martinez | B44C 1/28 382/190 |
| 2008/0046424 A1 * | 2/2008 | Horton | G06F 17/3025 |

FOREIGN PATENT DOCUMENTS

| CN | 101216841 | 7/2008 |
| CN | 102122389 | 7/2011 |

(Continued)

OTHER PUBLICATIONS

International Search Report and Written Opinion for Application No. PCT/CN2014/077186 dated Aug. 19, 2014 (11 pages).

*Primary Examiner* — Eueng-Nan Yeh
(74) *Attorney, Agent, or Firm* — Michael Best & Friedrich LLP

(57) ABSTRACT

The invention provides a method, server apparatus and terminal apparatus for providing an image, which can achieve an image search in accordance with a color, helps to make a user obtain an image of a color desired thereby, and can help a buyer to obtain a product of a color desired (Continued)

thereby in a comparatively accurate manner upon an application to the e-commerce field. The method comprises: a server receiving analysis data of color main components of an image to be inquired transmitted by a terminal device, then comparing the analysis data of the color main components of the image to be inquired with analysis data of color main components of a plurality of images in an image database, and transmitting identifications of the plurality of images having the greatest degree of similarity of a main color tone to the image to be inquired in the image database to the terminal device so that the terminal device acquires the images in accordance with the identifications.

15 Claims, 2 Drawing Sheets

(51) Int. Cl.
*G06K 9/62* (2006.01)
*G06T 3/40* (2006.01)
*G06T 5/10* (2006.01)
*G06K 9/46* (2006.01)
*G06T 7/11* (2017.01)
*G06T 7/194* (2017.01)

(52) U.S. Cl.
CPC .............. *G06K 9/6215* (2013.01); *G06T 3/40* (2013.01); *G06T 5/10* (2013.01); *G06T 7/11* (2017.01); *G06T 7/194* (2017.01); *G06T 2207/10004* (2013.01); *G06T 2207/10024* (2013.01)

(56) References Cited

FOREIGN PATENT DOCUMENTS

| | | |
|---|---|---|
| CN | 102722880 | 10/2012 |
| CN | 103268338 | 8/2013 |

* cited by examiner

METHOD, SERVER, DEVICE, AND TERMINAL DEVICE FOR PROVIDING AN IMAGE SEARCH

TECHNICAL FIELD

The invention relates to a method, server apparatus and terminal apparatus for providing an image.

BACKGROUND ART

In the e-commerce, a buyer can search a product through a name, brand, model number, price of the product and the like. With respect to some type of product, the buyer is more interested in the product color e.g., clothes, cosmetic and the like. Under this circumstance, it is hard to make the buyer obtain the product of the color desired thereby in a manner of searching for the name, brand, model number and price of the product.

SUMMARY OF THE INVENTION

In view of this, the invention provides a method, server apparatus and terminal apparatus for providing an image, which can achieve an image search in accordance with a color, helps to make a user obtain an image of a color desired thereby, and can help a buyer to obtain a product of a color desired thereby in a comparatively accurate manner upon an application to the e-commerce field.

In order to achieve the above object, according to one aspect of the invention, a method for providing an image is given.

The method for providing an image of the invention comprises: a server receiving analysis data of color main components of an image to be inquired transmitted by a terminal device, the analysis data of the color main components containing identifications of a preset number of main component colors with respect to the image to be inquired and proportions of the respective main component colors; the server comparing the analysis data of the color main components of the image to be inquired with analysis data of color main components of a plurality of images in an image database, and transmitting identifications of the plurality of images having the greatest degree of similarity of a main color tone to the image to be inquired in the image database to the terminal device so that the terminal device acquires the images in accordance with the identifications; the analysis data of the color main components of the image in the image database containing the identifications of the preset number of color main components with respect to the image and the proportions of the respective color main components, and a manner of dividing the color main components with respect to the image in the image database being the same as a manner of dividing the color main components with respect to the image to be inquired.

Optionally, before the step of a server receiving analysis data of color main components of an image to be inquired transmitted by a terminal device, the method further comprises performing the following steps with respect to the plurality of images in the image database: filtering images not having as white background in accordance with a preset RGB threshold; performing a scaling processing to make a width and a height of the image be specified values; performing a foreground extraction; performing an analysis of the color main components; and performing a deduplication processing of the images having similar color main components.

Optionally, the step of performing a foreground extraction comprises: starting from each pixel of a group of opposite boundaries of the image, finding out a first group of pixels which are the closest and have their RGB values smaller than a preset value towards a middle of the image in a direction perpendicular to the group of boundaries; and starting from a central line of the image parallel to the boundaries, finding out a second group of pixels which are the closest and have their RGB values smaller than the preset value towards both sides in a direction perpendicular to the central line; and using a region between the first group of pixels and the second group of pixels as the foreground of the image.

Optionally, the step of performing an analysis of the color main components comprises: dividing an HSV color space into a plurality of groups; performing an analysis of HSV color components in accordance with foreground pixels with respect to the image, and distributing the foreground pixels into the respective groups; calculating proportions of pixel numbers of the respective groups to a sum of the foreground image pixels; and using identifications of the preset number of groups having the largest proportions as the identifications of the main component colors.

Optionally, the step of performing a deduplication processing of the images having similar color main components comprises: removing groups having proportions smaller than a preset proportion threshold from the preset number of groups having the largest proportions in accordance with an analysis result of the color main components; and comparing every two of the remaining images having the same group number, and judging that the two images are similar and performing deduplication if any one of the following conditions is satisfied; a. after sequencing is performed in accordance with the proportion, the identifications of the groups and the proportions of the respective groups of the two images are both the same; b. after sequencing is performed in accordance with the proportion, the identifications of the groups of the two images are the same, the numbers are smaller than a half of the preset number, and an absolute value of a difference between the proportions of the groups having the same identification of the two images is no larger than a first preset difference value; and c. after sequencing is performed in accordance with the proportion, the identifications of the groups of the two images are the same, the numbers are both no smaller than a half of the preset number, and an absolute value of a difference between the proportions of the groups having the same identification of the two images is no larger than a second preset difference value, wherein the second preset difference value is larger than the first preset difference value.

Optionally, the degree of similarity of the main color tone is calculated in accordance with the following equations:

$$sim(i) = \sum_{j=0}^{N} \sum_{k=0}^{N} f(j,k)$$

$$f(j,k) = \begin{cases} Query(R_j) \times Database_i(R_k) \times W^{|j-k|}, & \text{if}(I(Query(R_j)) = I(Database(R_k))) \\ 0, & \text{otherwise} \end{cases}$$

where sim(i) denotes the degree of similarity of the main color tone between the image to be inquired and the $i^{th}$ image in the image database; N denotes the preset number; Query $(R_j)$ denotes the proportion of the $j^{th}$ color main component of the image to be inquired; Database$_i$(R$_k$) denotes the proportion of the k$^{th}$ color main component of the i$^{th}$ image in the image database; and W denotes a preset positive number smaller than 1.

According to another aspect of the invention, a server apparatus for providing an image is given.

The server apparatus for providing an image of the invention comprises: a receiving module for receiving analysis data of color main components of an image to be inquired transmitted by a terminal device, the analysis data of the color main components containing identifications of a preset number of main component colors with respect to the image to be inquired and proportions of the respective main component colors; and a transmitting module for comparing the analysis data of the color main components of the image to be inquired with analysis data of color main components of a plurality of images in an image database, and transmitting identifications of the plurality of images having the greatest degree of similarity of a main color tone to the image to be inquired in the image database to the terminal device so that the terminal device acquires the images in accordance with the identifications; the analysis data of the color main components of the image in the image database containing the identifications of the preset number of color main components with respect to the image and the proportions of the respective color main components, and a manner of dividing the color main components with respect to the image in the image database being the same as a manner of dividing the color main components with respect to the image to be inquired.

Optionally, the server apparatus further comprises: a background filtering module for filtering images not having a white background with respect to the plurality of images in the image database in accordance with a preset RGB threshold; an image scaling module for performing a scaling processing with respect to the plurality of images in the image database to make a width and a height of the image be specified values; a foreground extracting module for performing a foreground extraction with respect to the plurality of images in the image database; a color main component analyzing module for performing an analysis of the color main components with respect to the plurality of images in the image database; and a deduplicating module for performing a deduplication processing of the images having similar color main components with respect to the plurality of images in the image database.

Optionally, the foreground extracting module is further used for: starting from each pixel of a group of opposite boundaries of the image, finding out a first group of pixels which are the closest and have their RGB values smaller than a preset value towards a middle of the image in a direction perpendicular to the group of boundaries; and starting from a central line of the image parallel to the boundaries, finding out a second group of pixels which are the closest and have their RGB values smaller than the preset value towards both sides in a direction perpendicular to the central line; and using a region between the first group of pixels and the second group of pixels as the foreground of the image.

Optionally, the color main component analyzing module is further used for: dividing an HSV color space into a plurality of groups; performing an analysis of HSV color components in accordance with foreground pixels with respect to the image, and distributing the foreground pixels into the respective groups; calculating proportions of pixel numbers of the respective groups to a sum of the foreground image pixels; and using identifications of the preset number of groups having the largest proportions as the identifications of the main component colors.

Optionally, the deduplicating module is further used for: removing groups having proportions smaller than a preset proportion threshold from the preset number of groups having the largest proportions in accordance with an analysis result of the color main components; and comparing every two of the remaining images having the same group number, and judging that the two images are similar and performing deduplication if any one of the following conditions is satisfied: a. after sequencing is performed in accordance with the proportion, the identifications of the groups and the proportions of the respective groups of the two images are both the same; b. after sequencing is performed in accordance with the proportion, the identifications of the groups of the two images are the same, the numbers of the groups are smaller than a half of the preset number, and an absolute value of a difference between the proportions of the groups having the same identification of the two images is no larger than a first preset difference value; and c. after sequencing is performed in accordance with the proportion, the identifications of the groups of the two images are the same, the numbers of the groups are both no smaller than a half of the preset number, and an absolute value of a difference between the proportions of the groups having the same identification of the two images is no larger than a second preset difference value, wherein the second preset difference value is larger than the first preset difference value.

Optionally, the transmitting module is further used for calculating the degree of similarity of the main color tone in accordance with the following equations:

$$sim(i) = \sum_{j=0}^{N} \sum_{k=0}^{N} f(j,k)$$

$$f(j,k) = \begin{cases} \text{Query}(R_j) \times \text{Database}_i(R_k) \times W^{|j-k|}, & \text{if}(I(\text{Query}(R_j)) = I(\text{Database}(R_k))) \\ 0, & \text{otherwise} \end{cases}$$

where sim(i) denotes the degree of similarity of the main color tone between the image to be inquired and the i$^{th}$ image in the image database; N denotes the preset number; Query (R$_j$) denotes the proportion of the j$^{th}$ color main component of the image to be inquired; Database$_i$(R$_k$) denotes the proportion of the k$^{th}$ color main component of the i$^{th}$ image in the image database; and W denotes a preset positive number smaller than 1.

According to the technical solution of the invention, an analysis of color main components is performed with respect to an image in an image database, and an analysis of color main components is performed with respect to an image provided by a terminal device, whereby an image of a product having its main color tone close to a color specified by a user as far as possible is found out from the image database. This manner achieves an image search in accordance with a color, helps to make a user obtain an image of a color desired thereby, and helps a buyer to obtain a product of a color desired thereby in a comparatively accurate manner upon an application to the e-commerce field.

BRIEF DESCRIPTION OF THE DRAWINGS

Figures are used for better understanding the invention, and do not form improper limitations of the invention. Wherein.

DETAILED DESCRIPTION

The contents below give descriptions of exemplary embodiments of the invention by taking the figures into consideration, and the contents include various details of the embodiments of the invention to facilitate understanding, and shall be considered as exemplary ones only. Thus, those skilled in the art should realize that the embodiments described herein can be changed and modified in various manners without departing from the scope and spirit of the invention. Similarly, for clarity and conciseness, descriptions of common functions and structures are omitted in the descriptions below.

The technical solution of the embodiment of the invention is mainly applied to a smart telephone, after a user uses a telephone camera to aim at a color desired to be searched thereby and performs a color capturing operation, a software in the smart telephone activates the camera to acquire an image in a video frame, uses this image as the image to be inquired, performs an analysis of color main components with respect to the image, obtains main component colors of the image to be inquired and respective proportions of pixel numbers belonging to the respective main component colors to a total number of image pixels, i.e., proportions of the respective main component colors. The smart telephone transmits the analysis result to a server, the server searches a product having a color close to the color in the image as far as possible in an image database of a product in accordance with the image, and transmits identifications of the images to the smart telephone used by the user, and the above-mentioned software downloads the images from a network element storing the above-mentioned image database in accordance with the identifications.

Figure 1:
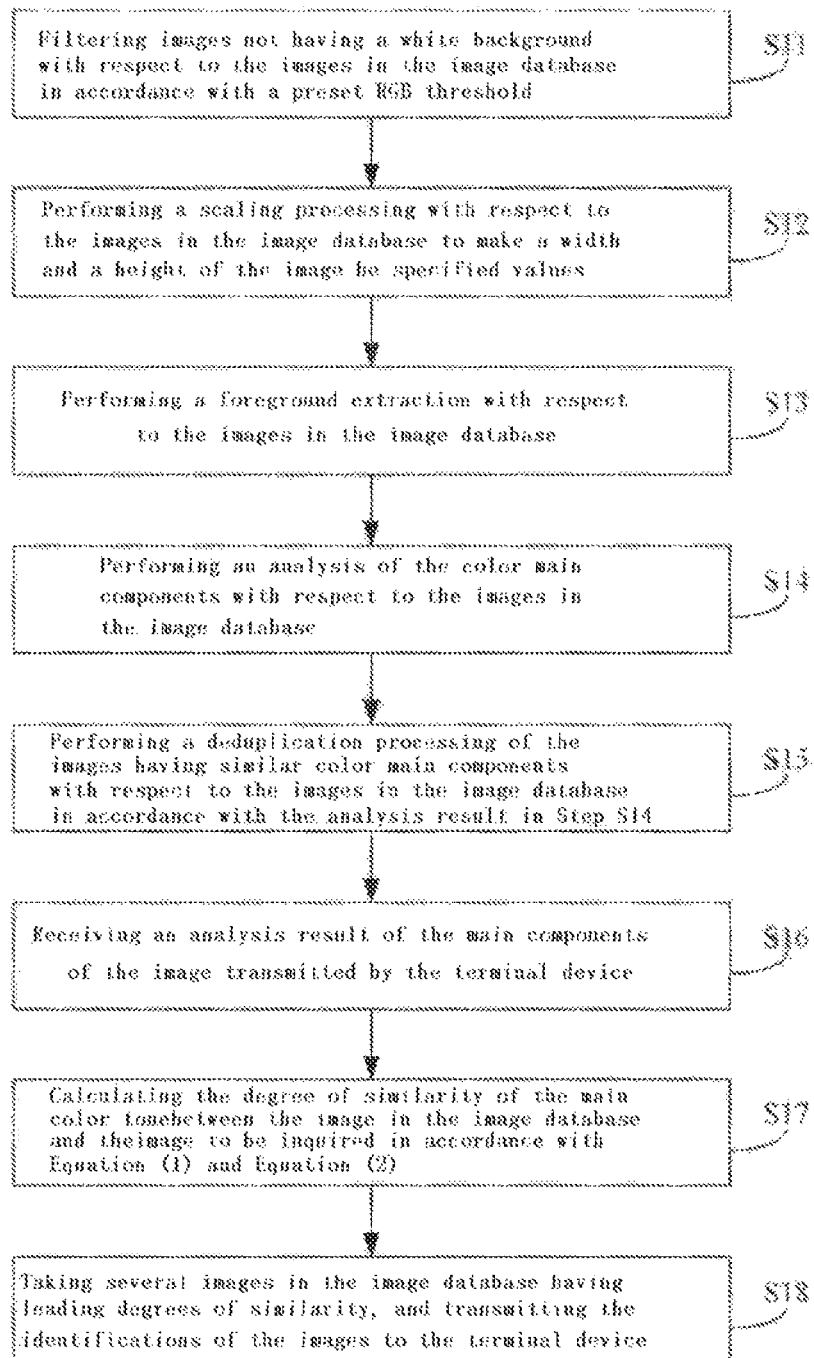
FIG. 1 is a schematic diagram of a method for providing an image according to an embodiment of the invention.

With respect to the above-mentioned server, it performs beforehand a same analysis of color main components with respect to the images in the image database to obtain the main component colors of the respective images and the proportions of the respective main component colors. The contents below give detailed descriptions of a method for providing an image in an embodiment of the invention by taking FIG. 1 into consideration. FIG. 1 is a schematic diagram of a method for providing an image according to an embodiment of the invention. The method is performed by the above-mentioned server.

Step S11: Filtering images not having a white background with respect to the images in the image database in accordance with a preset RGB threshold. The images in the image database formally have a standardization, which is mainly reflected in that the product is located in a center of the image and has a white background. Performance of a color analysis with respect to such image can obtain comparatively accurate product color characteristics. In the actual e-commerce field, the images in the image database of the product may be from multiple channels, e.g., the buyer of the product, so some product images may be not very standard, and this step just performs a processing with respect to such circumstance, and abandons the images not having a white background in the image database. During the specific processing, an outermost circle of pixels of the image can be inspected, and if R, G, B values of the pixels going beyond a certain proportion, e.g., 80%, among these pixels are larger than the preset RGB threshold, it is considered that the background is white. The RGB threshold herein is a comparatively large value but is smaller than 255, e.g., 220, i.e., the pixels close to white are also considered as white ones, and it is mainly considered that the background can be hardly completely white during shooting.

Step S12: Performing a scaling processing with respect to the images in the image database to make a width and a height of the image be specified values. Since many images in the image database are to be finally displayed on a terminal device, for a comparatively good displaying effect, the images can be subjected to the scaling processing so that the sizes of the images are unified.

Figure 2:
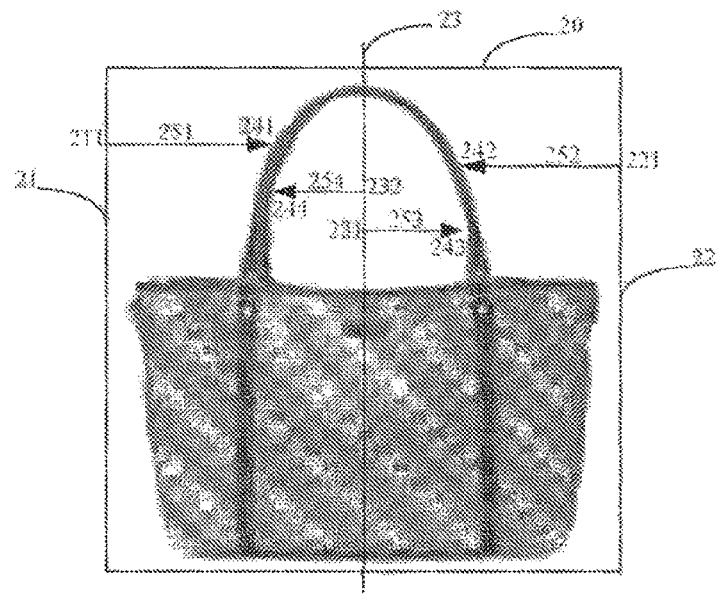
FIG. 2 is a schematic diagram of a foreground extraction according to an embodiment of the invention.

Step S13: Performing a foreground extraction with respect to the images in the image database. With respect to some products, the shapes of the products include an annular shape, the interior of the annular shape is still the background, and the color of the background (i.e., white as considered in Step S11) cannot serve as the color of the product itself, and thus should be removed. With respect to this, the embodiment can perform a processing in the following manner: firstly starting from each pixel of a group of opposite boundaries of the image, finding out a first group of pixels which are the closest and have their RGB values smaller than a preset value towards a middle of the image in a direction perpendicular to the group of boundaries; and starting from a central line of the image parallel to the boundaries, finding out a second group of pixels which are the closest and have their RGB values smaller than the preset value towards both sides in a direction perpendicular to the central line; and then using a region between the first group of pixels and the second group of pixels as the foreground of the image. The contents below give descriptions by means of examples by taking FIG. 2 into consideration. FIG. 2 is a schematic diagram of a foreground extraction according to an embodiment of the invention.

As shown in FIG. 2, starting from respective pixels on one boundary 21 of an image 20, a search is made towards a direction of a central line 23, e.g., one pixel 241 having its RGB value larger than a threshold is searched in a direction of an arrow 251; similarly, starting from respective pixels on a boundary 22, a search is made towards the direction of the central line 23, e.g., one pixel 242 having its RGB value larger than the threshold is searched in a direction of an arrow 252; and the pixels, e.g., the pixels 241, 242, found starting from the boundaries 21, 22 serve as a first group of pixels. A search is made from respective pixels on the central line 23 towards the directions of the boundaries 21, 22, e.g., starting from a pixel 231, one pixel 243 having its RGB value larger than the threshold is searched in a direction of an arrow 253; similarly, starting from a pixel 232, one pixel 244 having its RGB value larger than the threshold is searched in a direction of an arrow 254; and the pixels, e.g., the pixels 243, 244, found starting from the central line 23 serve as a second group of pixels. A region between the two groups of pixels is just the foreground.

Step S14: Performing an analysis of the color main components with respect to the images in the image database. In the embodiment, the analysis is performed in an HSV color space, and specifically, it is to firstly divide the HSV color space into a plurality of groups: then perform an analysis of HSV color components in accordance with foreground pixels with respect to the image; distribute the foreground pixels into the respective groups; then calculate proportions of pixel numbers of the respective groups to a sum of the foreground image pixels; and use identifications of the preset number of groups having the largest proportions as the identifications of the main component colors, i.e., taking several component colors having leading proportions as the main component colors of the image.

In the embodiment, the main component colors are expressed in a form of (M, N), where M denotes the identifications of the main component colors, i.e., the identifications of the groups obtained by dividing the HSV color space, and N denotes the above-mentioned proportion of the main component color M. For example, the HSV color space is divided into 65 groups, and a result obtained by performing an analysis of color main components with respect to a certain image is as follows (only a part of the result is listed herein):

(0, 0.008); (1, 0.002); (2, 0.01): (3, 0.035); (4, 0.001); . . . (63, 0.006); (64, 0.38).

Step S15: Performing a deduplication processing of the images having similar color main components with respect to the images in the image database in accordance with the analysis result in Step S14. In the embodiment, it is to firstly remove groups having proportions smaller than a preset proportion threshold from the preset number of groups having the largest proportions in accordance with an analysis result of the color main components; and then compare every two of the remaining images having the same group number, and judge that the two images are similar and perform deduplication if any one of the following conditions is satisfied:

a. after sequencing is performed in accordance with the proportion, the identifications of the groups and the proportions of the respective groups of the two images are both the same;
b. after sequencing is performed in accordance with the proportion, the identifications of the groups of the two images are the same, the numbers of the groups are smaller than a half of the preset number, and an absolute value of a difference between the proportions of the groups having the same identification of the two images is no larger than a first preset difference value; and
c. after sequencing is performed in accordance with the proportion, the identifications of the groups of the two images are the same, the numbers of the groups are both no smaller than a half of the preset number, and an absolute value of a difference between the proportions of the groups having the same identification of the two images is no larger than a second preset difference value, wherein the second preset difference value is larger than the first preset difference value.

The contents below give descriptions by taking examples into consideration. For example, 4 colors are taken as the color main components of the image, e.g., the groups having the top four proportions are taken, e.g., with respect to five images A, B, C, D, E, the groups having the top four portions are respectively as follows:

Image A: (64, 0.38), (7, 0.21), (26, 0,15), (33, 006);
Image B: (64, 0.35), (7, 0.23), (26, 0.15), (45, 0.08);
Image C: (64, 0.39), (7, 0.19), (26, 0.03), (54, 0.02);
Image D: (22, 0.43), (32, 0.32), (45, 0.02), (49, 0.016);
Image E: (22, 0.43), (32, 0.31), (47, 0.02), (44, 0.016).

Firstly, groups having proportions smaller than a preset proportion threshold are removed, e.g., the proportion threshold is 0.1, and a result is as follows:
Image A: (64, 0.38), (7, 0.21), (26, 0.15);
Image B: (64, 0.35), (7, 0.23), (26, 0.15);
Image C: (64, 0.39), (7, 0.19);
Image D: (22, 0.43), (32, 0.32);
Image E: (22, 0.43), (32, 0.31).

The image A and the image B both have 3 groups remained, the two images are compared, since 3 groups are larger than a half of 4 groups (2 groups), it indicates that the product is comparatively rich in the color, and at this time, a comparatively loose threshold 0.4 is adopted, so the proportions corresponding to the group 64 are respectively 0.38 and 0.35, and the difference value is 0.03, which is smaller than 0.4; similarly, the difference values between the proportions corresponding to the group 7 and the group 26 are respectively 0.02 and 0, which are both smaller than 0.4. At this time, it is considered that the color main components of the image A and the image B are similar, and one of the image A and the image B should be removed.

For another instance, the images C, D, E all have 2 groups remained, and 2 groups are no larger than a half of 4 groups, so it indicates that the product is comparatively single in the color, and at this time, a comparatively strict threshold, e.g., 0.2, shall be adopted. Thus, since the groups of the image C are different from those of the images D, E, the color main components are obviously different; and with respect to the image D and the image E, the groups are the same and the proportion difference in the same group is smaller than 0.2, so it is considered that the image D and the image E have similar color main components, and one of the image D and the image E should be removed.

The above-mentioned respective steps are ones performed beforehand before the server receives the image to be inquired. After Step S15, an inquiry by a terminal device can be accepted, i.e., Step S16 is entered.

Step S16: Receiving an analysis result of the main components of the image transmitted by the terminal device. The result is also in the above-mentioned form of (M, N), and like the analysis result in the image database, the groups having the top four proportions are taken.

Step S17: Calculating the degree of similarity of the main color tone between the image in the image database and the image to be inquired in accordance with Equation (1) and Equation (2).

$$sim(i) = \sum_{j=0}^{N} \sum_{k=0}^{N} f(j, k)$$

$$f(j, k) = \begin{cases} Query(R_j) \times Database_i(R_k) \times W^{|j-k|}, & \text{if}(I(Query(R_j)) = I(Database(R_k))) \\ 0, & \text{otherwise} \end{cases}$$

where sim(i) denotes the degree of similarity of the main color tone between the image to be inquired and the $i^{th}$ image in the image database: N denotes the preset number; Query $(R_j)$ denotes the proportion of the $j^{th}$ color main component of the image to be inquired; Database$_i(R_k)$ denotes the proportion of the $k^{th}$ color main component of the $i^{th}$ image in the image database; and W denotes a preset positive number smaller than 1. W is set herein for the reason that an impact of a sequence of the proportions of the color main components on the color difference between the two images is considered.

For example, the analysis result of the main components of the image to be inquired transmitted by the terminal device is as follows: (7, 0.29), (64, 0.31), (36, 0.14), (58, 0.01), then at this time, N in Equation (1) is 4. In accordance with Equation (2), as compared with the above-mentioned image A, i.e., (64, 0.38), (7, 0.21), (26, 0.15), (33, 0.06), for example. W=5 is taken, Equation (1) is expanded as follows: sim(i)=0.29×0.21×$0.5^{[1-2]}$+0.31×0.38×$0.5^{[2-1]}$=0.044675. The image to be inquired and the image A both contain the colors of the groups 7, 64, so the proportions of these two groups participate in the calculation, and since the other groups contained in the images are different, they belong to the other circumstances in Equation (2), and 0 is taken as the value of f(j,k). It is obtained in accordance with the calculation result that the degree of similarity of the main color tone between the image to be inquired and the above-mentioned image A is 0.044675.

Each image in the image database is subjected to the above-mentioned calculation to obtain the degree of similarity of the main color tone between each image and the image to be inquired. Then Step S18 is entered.

Step S18: Taking several images in the image database having leading degrees of similarity, and transmitting the identifications of the images to the terminal device. The identifications herein, e.g., image serial numbers, may be article numbers of products in the images in the e-commerce. Thus, the terminal device can download the corresponding images from the network in accordance with the identifications and display the images to the user.

The contents below give descriptions of the working principle of the terminal device. The terminal device may be a smart telephone, a software therein activates the camera of the smart telephone to thereby acquire a video frame, and an image block is acquired from a central position of the video frame. At this time, the user needs to aim at an object having a color to be inquired thereby. The size of the image block can be 16×16 pixels. Then, the image block is subjected to an analysis of the color main components, the manner is similar to the above-mentioned manner in Step S14, and the difference is only that the image block at this time is entirely used as a foreground target.

Strictly speaking, the object aimed at by the user has multiple colors due to the light ray or the object itself, and in order to make the user confirm the circumstance of the color aimed at thereby, main colors of the image block can be analyzed and then presented to the user. During the analysis, it is firstly considered whether or not the proportion of the group that ranks the first in the image block after the color analysis is larger than a comparatively large preset value $T_1$, if so, it indicates that there is an obviously prevailing color in the image block, and then the color can be used as the main color of the image block; and if the proportion of the group that ranks the first is smaller than $T_1$ but is larger than another preset value $T_2$, a main color having a color closest to the color of the pixel in the central position of the image block is used as the main color of the image block. With respect to the other circumstances, the color of the pixel in the central position of the image block is used as the main color of the image block. The above-mentioned analyzing manner is as shown in Equation (3):

$$S(i) = \begin{cases} \text{Mean}(U_0), \text{ if}(R_0 \geq T_1) \\ \text{Min}(dis(\text{Mean}(U_j)), \text{Centre}_0)), \text{ if}(T_2 \leq R_0 \leq T_1) \\ \text{Centre}_0, \text{ otherwise} \end{cases}$$

where S(i) denotes R, G, B values of the $i^{th}$ main color of the image block; Mean($U_j$) denotes a mean value of R, G, B of all of the pixels in the $j^{th}$ main component color of the $i^{th}$ image block; $R_0$ denotes a proportion of a first main component color; dis(*,*) denotes an Euclidean distance between vectors; and $T_1$ and $T_2$ denote preset proportion thresholds.

After the main color of the image block is obtained, the terminal device can output a color block, and the color thereof is just the obtained main color, so the user can confirm the color based on which the user makes the search. In accordance with the step in FIG. 1, some images having their color main components close to the color block as far as possible in the image database, and these images are all photos or pictures of product. It is considered that the user mainly searches for a certain kind of products in reality, so in Step S17, the images in the image database had better be a subset of all the images in the image database, and the subset is the photos or pictures of a kind of products specified by the user beforehand.

Figure 3:
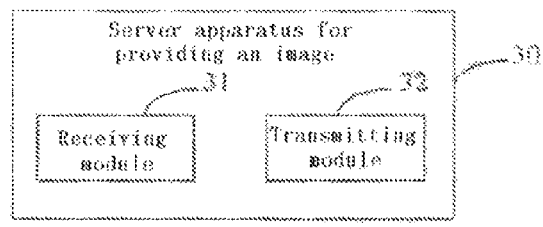
FIG. 3 is a schematic diagram of a basic structure of a server apparatus according to an embodiment of the invention.

The contents below give descriptions of a server apparatus and a terminal apparatus in the embodiment of the invention. FIG. 3 is a schematic diagram of a basic structure of a server apparatus according to an embodiment of the invention. The server apparatus can be disposed in the above-mentioned server. As shown in FIG. 3, a server apparatus 30 for providing an image mainly comprises a receiving module 31 and a transmitting module 32.

The receiving module 31 is used for receiving analysis data of color main components of an image to be inquired transmitted by a terminal device, the analysis data of the color main components containing identifications of a preset number of main component colors with respect to the image to be inquired and proportions of the respective main component colors; and the transmitting module 32 is used for comparing the analysis data of the color main components of the image to be inquired with analysis data of color main components of a plurality of images in an image database, and transmitting identifications of the plurality of images having the greatest degree of similarity of a main color tone to the image to be inquired in the image database to the terminal device so that the terminal device acquires the images in accordance with the identifications; the analysis data of the color main components of the image in the image database containing the identifications of the preset number of color main components with respect to the image and the proportions of the respective color main components, and a manner of dividing the color main components with respect to the image in the image database being the same as a manner of dividing the color main components with respect to the image to be inquired.

The server apparatus 30 for providing an image can further co6mprise the following modules (not shown): a background filtering module for filtering images not having a white background with respect to the plurality of images in the image database in accordance with a preset RGB threshold; an image scaling module for performing a scaling processing with respect to the plurality of images in the image database to make a width and a height of the image be specified values; a foreground extracting module for performing a foreground extraction with respect to the plurality of images in the image database; a color main component analyzing module for performing an analysis of the color main components with respect to the plurality of images in the image database; and a deduplicating module for performing a deduplication processing of the images having similar color main components with respect to the plurality of images in the image database.

The foreground extracting module can be further used for: starting from each pixel of a group of opposite boundaries of the image, finding out a first group of pixels which are the closest and have their RGB values smaller than a preset value towards a middle of the image in a direction perpendicular to the group of boundaries; and starting from a central line of the image parallel to the boundaries, finding out a second group of pixels which are the closest and have their RGB values smaller than the preset value towards both sides in a direction perpendicular to the central line; and using a region between the first group of pixels and the second group of pixels as the foreground of the image.

The color main component analyzing module can be further used for: dividing an HSV color space into a plurality of groups; performing an analysis of HSV color components in accordance with foreground pixels with respect to the image, and distributing the foreground pixels into the respective groups; calculating proportions of pixel numbers of the respective groups to a sum of the foreground image pixels; and using identifications of the preset number of groups having the largest proportions as the identifications of the main component colors.

The deduplicating module can be further used for: removing groups having proportions smaller than a preset proportion threshold from the preset number of groups having the largest proportions in accordance with an analysis result of the color main components; and comparing every two of the remaining images having the same group number, and judging that the two images are similar and performing deduplication if any one of the following conditions is satisfied:

a. after sequencing is performed in accordance with the proportion, the identifications of the groups and the proportions of the respective groups of the two images are both the same;
b. after sequencing is performed in accordance with the proportion, the identifications of the groups of the two images are the same, the numbers of the groups are smaller than a half of the preset number, and an absolute value of a difference between the proportions of the groups having the same identification of the two images is no larger than a first preset difference value; and
c. after sequencing is performed in accordance with the proportion, the identifications of the groups of the two images are the same, the numbers of the groups are both no smaller than a half of the preset number, and an absolute value of a difference between the proportions of the groups having the same identification of the two images is no larger than a second preset difference value, wherein the second preset difference value is larger than the first preset difference value.

The transmitting module can be further used for calculating the degree of similarity of the main color tone in accordance with Equation (1) and Equation (2).

Figure 4:
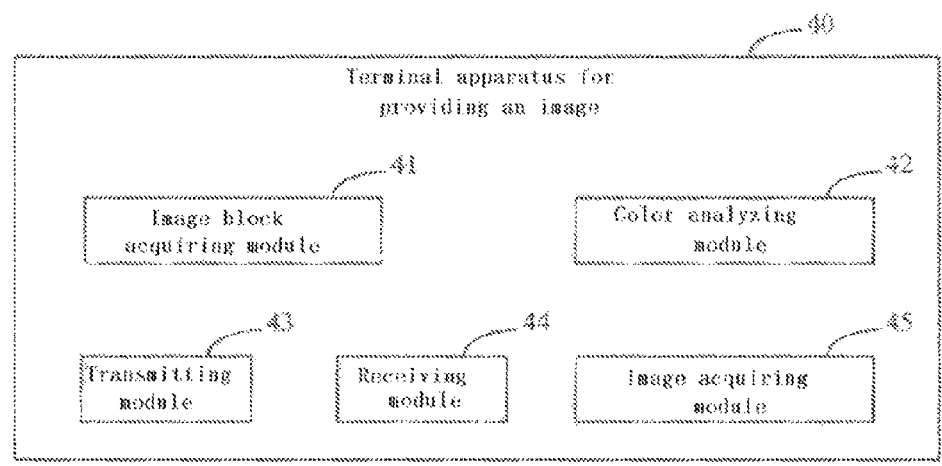
FIG. 4 is a schematic diagram of a basic structure of a terminal apparatus for providing an image according to an embodiment of the invention.

FIG. 4 is a schematic diagram of a basic structure of a terminal apparatus for providing an image according to an embodiment of the invention. The terminal apparatus for providing an image according to the embodiment of the invention can be disposed on the above-mentioned smart telephone. As shown in FIG. 4, a terminal apparatus 40 for providing an image mainly comprises an image block acquiring module 41, a color analyzing module 42, a transmitting module 43, a receiving module 44, and an image acquiring module 45.

The image block acquiring module 41 is used for acquiring an image block from a video frame; the color analyzing module 42 is used for performing an analysis of color main components with respect to the image block to thereby obtain identifications of a preset number of color main components and proportions of the respective color main components; the transmitting module 43 is used for transmitting an analysis result of the color analyzing module to a server; the receiving module 44 is used for receiving identifications of an image transmitted by the server, the image being one in an image database having a main color tone having the greatest degree of similarity to a main color tone of the image block obtained by the server comparing the analysis result with analysis data of color main components of a plurality of images in the image database; and the image acquiring module 45 is used for acquiring the image in accordance with the identification the image transmitted by the server.

The color analyzing module can be further used for: dividing an HSV color space into a plurality of groups; performing an analysis of HSV color components with respect to the image block, and distributing pixels in the image block into the respective groups; calculating proportions of pixel numbers of the respective groups to a sum of pixels of the image block; and using identifications of the preset number of groups having the largest proportions as the identifications of the main component colors.

The terminal apparatus 40 for providing an image can further comprise a main color analyzing module and an outputting module (not shown), wherein the main color analyzing module is used for obtaining a main color of the image block in accordance with Equation (3), and the outputting module is used for outputting a color block of the main color, so that the user confirms the color to be inquired thereby.

According to the technical solution of the invention, an analysis of color main components is performed with respect to an image in an image database, and an analysis of color main components is performed with respect to an image provide by a terminal device, whereby an image of a product having its main color tone close to a color specified by a user as far as possible is found out from the image database. This manner achieves an image search in accordance with a color, helps to make a user obtain an image of a color desired thereby, and helps a buyer to obtain a product of a color desired thereby in a comparatively accurate manner upon an application to the e-commerce field.

The contents above describe the basic principle of the invention by taking the embodiments into consideration, but it should be noted that those skilled in the art can understand all of or any of steps or components of the method and device of the invention, and can perform achievement in any computing apparatus (including a processor, a storage medium, etc.) or a network of a computing apparatus with a hardware, a firmware, a software or a combination thereof. This can be achieved by those skilled in the art just by using their basic programming skills in the case of reading the descriptions of the invention.

Thus, the object of the invention can be further achieved by running a program or a group of programs on any computing apparatus. The computing apparatus can be a common universal apparatus. Thus, the object of the invention can be also achieved only by providing a program product containing a program code for achieving the method or apparatus. That is to say, such program product also forms the invention, and a storage medium storing such program product also forms the invention. Obviously, the storage medium can be any common storage medium or any storage medium to be developed in the future.

It should be further noted that in the apparatus and method of the invention, it is obvious that the respective components or respective steps can be separated and/or recombined.

These separations and/or recombinations shall be deemed as equivalent solutions of the invention. Furthermore, the steps for performing the above-mentioned series of processings can be naturally chronologically performed in the described order, but are not necessarily chronologically performed. Some steps can be performed in parallel or independently of each other.

The above embodiments do not form limitations of the scope of protection of the invention. Those skilled in the art should understand that depending on requirements for design and other factors, various modifications, combinations, sub-combinations and substitutions can occur. Any modification, equivalent substitution, improvement and the like made within the spirit and principle of the invention shall be contained in the scope of protection of the invention.

The invention claimed is:

1. A method for providing an image, characterized in that the method comprising:
   a server receiving analysis data of color main components of an image to be inquired transmitted by a terminal device, the analysis data of the color main components containing identifications of a preset number of main component colors with respect to the image to be inquired and proportions of the respective main component colors;
   the server comparing the analysis data of the color main components of the image to be inquired with analysis data of color main components of a plurality of images in an image database, and transmitting identifications of the plurality of images having the greatest degree of similarity of a main color tone to the image to be inquired in the image database to the terminal device so that the terminal device acquires a plurality of images in accordance with the identifications; the analysis data of the color main components of the plurality of images in the image database containing the identifications of the preset number of color main components with respect to the image and the proportions of the respective color main components, and a manner of dividing the color main components with respect to the image in the image database being the same as a manner of dividing the color main components with respect to the image to be inquired.

2. The method according to claim 1, characterized in that before the step of a server receiving analysis data of color main components of an image to be inquired transmitted by a terminal device, the method further comprises performing the following steps with respect to the plurality of images in the image database:
   filtering images not having a white background in accordance with a preset RGB threshold;
   performing a scaling processing to make a width and a height of an image be specified values;
   performing a foreground extraction;
   performing an analysis of the color main components; and
   performing a deduplication processing of the images having similar color main components.

3. The method according to claim 2, characterized in that the step of performing a foreground extraction comprises:
   starting from each pixel of a group of opposite boundaries of the image, finding out a first group of pixels which are closest in RGB values and the RGB values are smaller than a preset value towards a middle of the image in a direction perpendicular to the group of boundaries; and
   starting from a central line of the image parallel to the boundaries, finding out a second group of pixels which are closest in RGB values and the RGB values are smaller than the preset value towards both sides in a direction perpendicular to the central line; and
   using a region between the first group of pixels and the second group of pixels as the foreground of the image.

4. The method according to claim 2, characterized in that the step of performing an analysis of the color main components comprises:
   dividing an HSV color space into a plurality of groups;
   performing an analysis of HSV color components in accordance with foreground pixels with respect to the image, and assigning the foreground pixels to the respective groups;
   calculating proportions of pixel numbers of each group to a sum of the foreground image pixels; and
   using identifications of a preset number of groups having the largest proportions as the identifications of the main component colors.

5. The method according to claim 4, characterized in that the step of performing a deduplication processing of the images having similar color main components comprises:
   removing groups having proportions smaller than a preset proportion threshold from the preset number of groups having the largest proportions in accordance with an analysis result of the color main components; and
   comparing every two of the images having the same group number in a remaining group, and judging that the two images are similar and performing deduplication if any one of the following conditions is satisfied:
   a. after sequencing is performed in accordance with the proportion, the identifications of the groups and the proportions of the respective groups of the two images are both the same;
   b. after sequencing is performed in accordance with the proportion, the identifications of the groups of the two images are the same, a number of the groups are smaller than a half of the preset number of groups, and an absolute value of a difference between the proportions of the groups having the same identification of the two images is no larger than a first preset difference value; and
   c. after sequencing is performed in accordance with the proportion, the identifications of the groups of the two images are the same, a number of the groups are both no smaller than a half of the preset number of groups, and an absolute value of a difference between the proportions of the groups having the same identification of the two images is no larger than a second preset difference value,
   wherein the second preset difference value is larger than the first preset difference value.

6. The method according to claim 1, characterized in that the degree of similarity of the main color tone is calculated in accordance with the following equations:

$$sim(i) = \sum_{j=0}^{N} \sum_{k=0}^{N} f(j,k)$$

$$f(j,k) = \begin{cases} Query(R_j) \times Database_i(R_k) \times W^{|j-k|}, & \text{if}(I(Query(R_j)) = I(Database(R_k))) \\ 0, & \text{otherwise} \end{cases}$$

where sim(i) denotes the degree of similarity of the main color tone between the image to be inquired and the $i^{th}$ image in the image database; N denotes the preset number; Query($R_j$) denotes the proportion of the $j^{th}$ color main component of the image to be inquired; Database$_i$($R_k$) denotes the proportion of the $k^{th}$ color main component of the $i^{th}$ image in the image database; and W denotes a preset positive number smaller than 1.

7. A server apparatus for providing an image, characterized by comprising:
   a receiving module for receiving analysis data of color main components of an image to be inquired transmitted by a terminal device, the analysis data of the color main components containing identifications of a preset number of main component colors with respect to the image to be inquired and proportions of the respective main component colors; and
   a transmitting module for comparing the analysis data of the color main components of the image to be inquired with analysis data of color main components of a plurality of images in an image database, and transmitting identifications of the plurality of images having the greatest degree of similarity of a main color tone to the image to be inquired in the image database to the terminal device so that the terminal device acquires a plurality of images in accordance with the identifications; the analysis data of the color main components of the plurality of images in the image database containing the identifications of the preset number of color main components with respect to the image and the proportions of the respective color main components, and a manner of dividing the color main components with respect to the image in the image database being the same as a manner of dividing the color main components with respect to the image to be inquired.

8. The server apparatus according to claim 7, characterized by further comprising:
   a background filtering module for filtering images not having a white background with respect to the plurality of images in the image database in accordance with a preset RGB threshold;
   an image scaling module for performing a scaling processing with respect to the plurality of images in the image database to make a width and a height of an image be specified values;
   a foreground extracting module for performing a foreground extraction with respect to the plurality of images in the image database;
   a color main component analyzing module for performing an analysis of the color main components with respect to the plurality of images in the image database; and
   a deduplicating module for performing a deduplication processing of the images having similar color main components with respect to the plurality of images in the image database.

9. The server apparatus according to claim 8, characterized in that the foreground extracting module is further used for:
   starting from each pixel of a group of opposite boundaries of the image, finding out a first group of pixels which are closest in RGB values and the RGB values are smaller than a preset value towards a middle of the image in a direction perpendicular to the group of boundaries; and
   starting from a central line of the image parallel to the boundaries, finding out a second group of pixels which are closest in RGB values and the RGB values are smaller than the preset value towards both sides in a direction perpendicular to the central line; and
   using a region between the first group of pixels and the second group of pixels as the foreground of the image.

10. The server apparatus according to claim 8, characterized in that the color main component analyzing module is further used for:
   dividing an HSV color space into a plurality of groups;
   performing an analysis of HSV color components in accordance with foreground pixels with respect to the image, and assigning the foreground pixels to the respective groups;
   calculating proportions of pixel numbers of the respective groups to a sum of the foreground image pixels; and
   using identifications of a preset number of groups having the largest proportions as the identifications of the main component colors.

11. The server apparatus according to claim 10, characterized in that the deduplicating module is further used for:
   removing groups having proportions smaller than a preset proportion threshold from the preset number of groups having the largest proportions in accordance with an analysis result of the color main components; and
   comparing every two of the images having the same group number in a remaining group, and judging that the two images are similar and performing deduplication if any one of the following conditions is satisfied:
   a. after sequencing is performed in accordance with the proportion, the identifications of the groups and the proportions of the respective groups of the two images are both the same;
   b. after sequencing is performed in accordance with the proportion, the identifications of the groups of the two images are the same, a number of the groups are smaller than a half of the preset number of groups, and an absolute value of a difference between the proportions of the groups having the same identification of the two images is no larger than a first preset difference value; and
   c. after sequencing is performed in accordance with the proportion, the identifications of the groups of the two images are the same, a number of the groups are both no smaller than a half of the preset number of groups, and an absolute value of a difference between the proportions of the groups having the same identification of the two images is no larger than a second preset difference value,
   wherein the second preset difference value is larger than the first preset difference value.

12. The server apparatus according to claim 7, characterized in that the transmitting module is further used for calculating the degree of similarity of the main color tone in accordance with the following equations:

$$sim(i) = \sum_{j=0}^{N} \sum_{k=0}^{N} f(j,k)$$

$$f(j,k) = \begin{cases} \text{Query}(R_j) \times \text{Database}_i(R_k) \times W^{|j-k|}, & \text{if}(I(\text{Query}(R_j)) = I(\text{Database}(R_k))) \\ 0, & \text{otherwise} \end{cases}$$

where sim(i) denotes the degree of similarity of the main color tone between the image to be inquired and the $i^{th}$ image in the image database; N denotes the preset number; Query($R_j$) denotes the proportion of the $j^{th}$ color main component of the image to be inquired;

Database$_i$(R$_k$) denotes the proportion of the k$^{th}$ color main component of the i$^{th}$ image in the image database; and W denotes a preset positive number smaller than 1.

13. A terminal apparatus for providing an image, characterized by comprising:
  an image block acquiring module for acquiring an image block from a video frame;
  a color analyzing module for performing an analysis of color main components with respect to the image block to thereby obtain identifications of a preset number of color main components and proportions of the respective color main components;
  a transmitting module for transmitting an analysis result of the color analyzing module to a server;
  a receiving module for receiving an identification of an image transmitted by the server, the image being one in an image database having a main color tone having the greatest degree of similarity to a main color tone of the image block obtained by the server comparing the analysis result with analysis data of color main components of a plurality of images in the image database; and
  an image acquiring module for acquiring the image in accordance with the identification the image transmitted by the server.

14. The terminal apparatus according to claim 13, characterized in that the color analyzing module is further used for:
  dividing an HSV color space into a plurality of groups;
  performing an analysis of HSV color components with respect to the image block, and assigning pixels in the image block to the respective groups;
  calculating proportions of pixel numbers of the respective groups to a sum of pixels of the image block; and
  using identifications of a preset number of groups having the largest proportions as the identifications of the main component colors.

15. The terminal apparatus according to claim 13, characterized by further comprising a main color analyzing module and an outputting module, wherein
  the main color analyzing module is used for obtaining a main color of the image block in accordance with the following equation:

$$S(i) = \begin{cases} \text{Mean}(U_0), & \text{if}(R_0 \geq T_1) \\ \text{Min}(dis(\text{Mean}(U_j), \text{Centre}_0)), & \text{if}(T_2 \leq R_0 \leq T_1) \\ \text{Centre}_0, & \text{otherwise} \end{cases}$$

where S(i) denotes R, G, B values of the main color of the i$^{th}$ image block; Mean(U$_j$) denotes a mean value of R, G, B of all of the pixels in the j$^{th}$ main component color of the i$^{th}$ image block; R$_0$ denotes a proportion of a first main component color; dis(*,*) denotes an Euclidean distance between vectors; and T$_1$ and T$_2$ denote preset proportion thresholds; Centre$_0$ denotes a main color of the pixel in the central position of the i$^{th}$ image block; and
  the outputting module is used for outputting a color block of the main color.

* * * * *